(12) United States Patent
Louch et al.

(10) Patent No.: US 10,452,240 B2
(45) Date of Patent: Oct. 22, 2019

(54) USER-CENTRIC WIDGETS AND DASHBOARDS

(71) Applicant: Apple Inc., Cupertino, CA (US)

(72) Inventors: John O. Louch, San Luis Obispo, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/277,991

(22) Filed: Sep. 27, 2016

(65) Prior Publication Data

US 2018/0011625 A1 Jan. 11, 2018

Related U.S. Application Data

(63) Continuation of application No. 14/579,928, filed on Dec. 22, 2014, now Pat. No. 9,483,164, which is a continuation of application No. 12/002,280, filed on Dec. 14, 2007, now Pat. No. 8,954,871.

(60) Provisional application No. 60/950,410, filed on Jul. 18, 2007.

(51) Int. Cl.
| | |
|---|---|
| *G06F 3/0484* | (2013.01) |
| *G06F 9/451* | (2018.01) |
| *G06F 3/0481* | (2013.01) |
| *G06F 9/445* | (2018.01) |
| *G06F 9/50* | (2006.01) |
| *H04L 29/08* | (2006.01) |

(52) U.S. Cl.
CPC ...... *G06F 3/04842* (2013.01); *G06F 3/04817* (2013.01); *G06F 9/44505* (2013.01); *G06F 9/451* (2018.02); *G06F 9/5033* (2013.01); *H04L 67/10* (2013.01)

(58) Field of Classification Search
CPC . G06F 3/0481; G06F 3/04817; G06F 3/04842
See application file for complete search history.

(56) References Cited

U.S. PATENT DOCUMENTS

| | | | | |
|---|---|---|---|---|
| 5,689,664 | A * | 11/1997 | Narayanan | G06F 9/449 715/769 |
| 6,232,957 | B1 * | 5/2001 | Hinckley | G06F 3/03543 345/156 |
| 6,333,753 | B1 * | 12/2001 | Hinckley | G06F 3/03543 345/156 |
| 6,892,360 | B1 * | 5/2005 | Pabla | G06F 3/0482 715/802 |
| 2002/0054148 | A1 * | 5/2002 | Okada | G06F 9/453 715/810 |
| 2004/0225955 | A1 * | 11/2004 | Ly | G06Q 10/06 715/273 |
| 2005/0172239 | A1 * | 8/2005 | Liu | G06F 3/0481 715/763 |
| 2006/0150122 | A1 * | 7/2006 | Hintermeister | G06F 9/4443 715/833 |
| 2007/0101297 | A1 * | 5/2007 | Forstall | G06F 3/04817 715/841 |
| 2007/0233736 | A1 * | 10/2007 | Xiong | G06Q 30/02 |
| 2007/0273558 | A1 * | 11/2007 | Smith | G08G 1/0962 340/995.1 |

(Continued)

*Primary Examiner* — Phenuel S Salomon
(74) *Attorney, Agent, or Firm* — Fernando & Partners, LLP; Prateek Bhatnagar (57) ABSTRACT

User-centric widgets and dashboards are automatically modified to reflect a user's goals and needs.

23 Claims, 6 Drawing Sheets

(56) References Cited

U.S. PATENT DOCUMENTS

| | | | |
|---|---|---|---|
| 2008/0040681 A1* | 2/2008 | Synstelien | G06F 9/451 715/765 |
| 2008/0052348 A1* | 2/2008 | Adler | H04L 67/306 709/203 |
| 2008/0097906 A1* | 4/2008 | Williams | G06Q 20/10 705/44 |
| 2008/0126937 A1* | 5/2008 | Pachet | G06F 3/017 715/720 |
| 2008/0154859 A1* | 6/2008 | Chi | G06F 17/30864 |
| 2008/0155453 A1* | 6/2008 | Othmer | H04M 1/72572 715/774 |
| 2008/0294998 A1* | 11/2008 | Pyhalammi | G06F 9/4443 715/748 |
| 2009/0024943 A1* | 1/2009 | Adler | G04G 13/021 715/764 |
| 2009/0113346 A1* | 4/2009 | Wickramasuriya | G06F 3/0481 715/825 |
| 2011/0099487 A1* | 4/2011 | Pyhalammi | G06F 8/38 715/762 |
| 2018/0011625 A1* | 1/2018 | Louch | G06F 3/04817 |

* cited by examiner

USER-CENTRIC WIDGETS AND DASHBOARDS

RELATED APPLICATIONS

This application is a continuation of and claims priority to U.S. patent application Ser. No. 14/579,928, entitled "User-Centric Widgets and Dashboards," filed on Dec. 22, 2014, which is a continuation of and claims priority to U.S. patent application Ser. No. 12/002,280, entitled "User-Centric Widgets and Dashboards," filed on Dec. 14, 2007 (now U.S. Pat. No. 8,954,871), which claims the benefit of priority from U.S. Provisional Patent Application No. 60/950,410, filed Jul. 18, 2007, for "User-Centric Widgets and Dashboards," the entire contents of each of which are incorporated herein by reference.

This application is related to U.S. patent application Ser. No. 11/403,644, for "Linked Widgets," filed Apr. 12, 2006, which patent application is incorporated by reference herein in its entirety.

TECHNICAL FIELD

The subject matter of this patent application is generally related to graphical user interfaces.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

Although users appreciate interfaces that can present information on a screen via multiple windows, the result can be overwhelming. For example, users may find it difficult to navigate to a particular user interface element or to locate a desired element among a large number of onscreen elements. The problem is further compounded when user interfaces allow users to position elements in a desired arrangement, including overlapping, minimizing, maximizing, and the like. Although such flexibility may be useful to the user, it can result in a cluttered display screen. Having too many elements displayed on the screen can lead to "information overload," thus inhibiting the user to efficiently use the computer equipment.

Many of the deficiencies of conventional user interfaces can be reduced using "widgets." Generally, widgets are user interface elements that include information and one or more tools that let the user perform common tasks and provide fast access to information. Widgets can perform a variety of tasks, including without limitation, communicating with a remote server to provide information to the user (e.g., weather report), providing commonly needed functionality (e.g., a calculator), or acting as an information repository (e.g., a notebook). Widgets can be displayed and accessed through an environment referred to as a "unified interest layer," "dashboard layer," "dashboard environment," or "dashboard."

The popularity of widgets has led to a proliferation of publicly available widgets that can perform a variety of useful tasks. The abundance of widgets, however, has created a need for technology that applies user-centric criteria to the distribution, installation, preview, configuration and presentation of widgets and/or dashboards.

SUMMARY

User-centric widgets and dashboards are automatically modified to reflect a user's goals and needs.

In some implementations, a method includes: providing a user interface; presenting a widget on the user interface; receiving input; updating a user model based on the input; and updating the widget based on the user model.

In some implementations, a method includes: collecting user data; updating a user model with the user data; and updating a dashboard or widget based on the user model.

In some implementations, a system includes a processor and a computer-readable medium operatively coupled to the processor. A data collection engine stored on the computer-readable medium is configurable by the processor for collecting user data from the system. A user model engine stored on the computer-readable medium and operatively coupled to the data collection engine is configurable by the processor for receiving user data from the data collection engine and updating a user model using the user data. An update engine stored on the computer-readable medium and operatively coupled to the user model engine is configurable for updating a widget based on the user model.

Other implementations of user-centric widgets and dashboards are disclosed, including implementations directed to systems, methods, apparatuses, computer-readable mediums and user interfaces.

DETAILED DESCRIPTION

Dashboard & Widget Overview

A dashboard is an environment or layer where information and utilities can be displayed. The information and utilities can be embodied in "widgets." Multiple widgets can exist in a dashboard at any given time. Users can control what widgets are visible and can freely move the widgets in the dashboard. In some implementations, widgets can be displayed and hidden along with the dashboard and can share the dashboard. When the dashboard is dismissed, the widgets disappear along with the dashboard.

In some implementations, widgets are objects that users interact with when a dashboard is invoked. In other implementations, widgets can be displayed in any user interface without a dashboard, including an operating system window (e.g., a desktop) or application window, or one or more display areas (or portions thereof) of a user interface. Widgets can perform tasks for the user, such as providing a clock or a calculator. A widget can present useful information to the user or help the user obtain information with a minimum of required input. In some implementations, widgets are powered by known web technologies, such as Hypertext Mark-up Language (HTML), Cascading Style Sheets (CSS) and JavaScript®. Some widgets can also provide preferences, localization and system access. In the description and examples that follow, a user interacts with representations of dashboards and widgets, such as icons or thumbnail images. These representations may be referred to simply as dashboards or widgets throughout the specification and claims.

In some implementations, a dashboard is displayed such that a user can select a widget, causing the widget to be displayed without a dashboard (e.g., on a desktop user interface or application window). In such implementations, the user can click on a button or other user interface element to get back the dashboard.

Widgets can be developed using publicly available software development tools, such as Web Kit, Dashcode® and Xcode®, which are available from Apple Computer, Inc, (Cupertino, Calif.). Web Kit provides a set of classes to display web content in windows, and implements browser features such as following links when clicked by the user, managing a back-forward list, and managing a history of pages recently visited. The Web Kit simplifies the process of web page loading by asynchronously requesting web content from an HTTP server where the response may arrive incrementally, in random order, or partially due to network errors. The Web Kit also simplifies the process of displaying that content and compound frame elements each with their own set of scroll bars. Dashcode® provides developers with tools for building widgets. Xcode® is a tool for developing software on Mac OS® X, and is bundled with Apple's Mac OS® X, version 10.4 ("Tiger") operating system.

In some implementations, a widget can be distributed as a bundle structure. A bundle is a directory in a file system that groups related resources together in one location. A widget's bundle can contain an information property list file, an HTML file, icon and default image files (e.g., portable network graphics files) and a style information file (e.g., a CSS file). In some implementations, the information property list file provides a dashboard with information about a widget (e.g., name, version, widget height and width, x and y coordinates for placement of the widget close box, etc.). The dashboard can use the information property list file to set up a space or "view" in the dashboard in which the widget can operate. The information property list file can also include access keys which provide access to external resources (e.g., the Internet).

User-Centric Dashboard/Widget System

Figure 1:
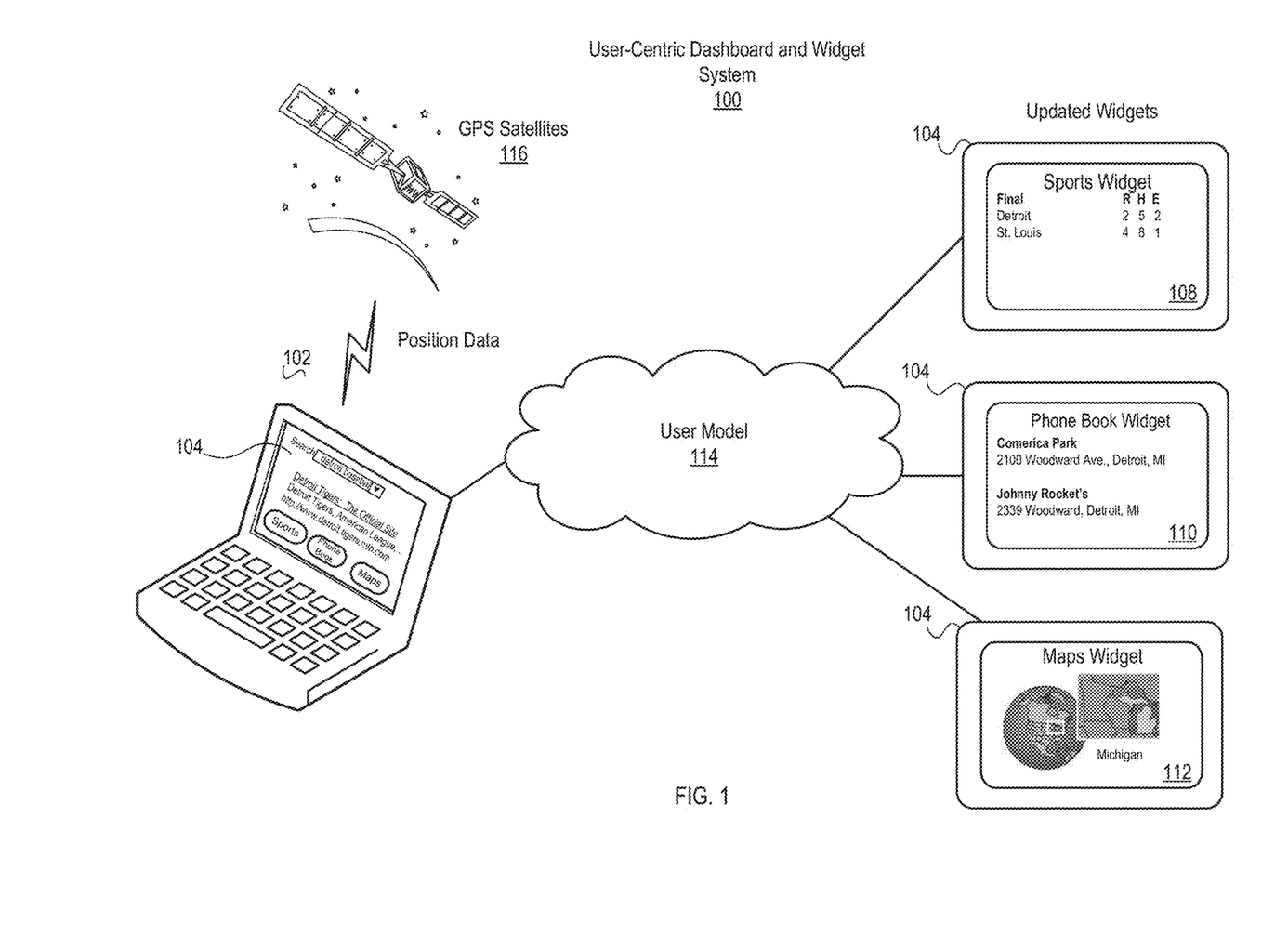
FIG. 1 is a block diagram of one implementation of a user-centric dashboard and widget system.

FIG. 1 is a block diagram of one implementation of a user-centric dashboard and widget system 100. The system 100 generally includes a device 102 configured for coupling to a network. In some implementations, the device 102 is a "location-aware" device and includes means for determining its geographic location using positioning technology. Positioning technology can include a Global Positioning System (GPS) 116, analog acoustic time-of-flight (TOF), cellular grid technology, geo-location by Internet Protocol (IP) address or any other positioning technology. The positioning information can be computed by the device 102 or provided to the device 102 over, for example, the network. In some implementations, the device 102 can include components (e.g., a GPS receiver) for receiving positioning information from the GPS 116 and computing a geographic location.

The network (e.g., the Internet, wireless network) can be coupled to a repository (e.g., a My SQL® database) for storing a user model 114, configuration data, updates and any other user-centric information associated with the device 102. The device 102 can be coupled to the network using any known connector, port or bus (e.g., USB, Firewire®, Ethernet, DSL, cable modem, wireless link).

The system 100 is one example of a user-centric dashboard and widget system. Other configurations are possible including more or fewer components. For example, the device 102 can be any device capable of presenting dashboards and/or widgets, including but not limited to: consumer electronic devices, computers, mobile phones, media players/recorders, game consoles, tablets, set-top boxes, television systems, personal digital assistants (PDAs), storage devices, digital cameras, digital video recorders, email devices, etc. In some implementations, the device 102 can operate without being connected to the network or the GPS system 116.

User Model Approach

In some implementations, the system 100 automatically modifies dashboards and/or widgets installed on the device 102 based on the types of tasks or sequence of actions performed on the device 102 by a user. For example, in some implementations when a user performs a sequence of actions on the device 102 (e.g., interacts with an application hosted on the device 102), the actions can be observed and recorded as user data. A user model 114 can then be updated or otherwise modified with the user data.

In some implementations, the user model 114 can be implemented using Bayesian and decision-theoretic methods, such as the methods described in, for example, Horvitz, E., et al. The Lumiere Project: Bayesian User Modeling for Inferring the Goals and Needs of Software Users, *Fourteenth Conference on Uncertainty in Artificial Intelligence* (Madison, Wis., July 1998), Morgan Kaufman Publishers, pp. 256-265, which article is incorporated by reference herein in its entirety. A Bayesian user model can be created by observing several classes of evidential distinctions with relevance to a user's needs. Some or all of these classes can be sub-classed with specific types of data structures and displayed objects to provide a rich set of observations with probabilistic links to a user's goals.

Examples of classes of evidence can include but are not limited to:
  Search: Repetitive, scanning patterns associated with attempts to search for or access an item or functionality can be used to determine a user's goals and needs. Distinctions can include observation of the user exploring multiple menus, scrolling through text and mousing over and clicking on multiple non-active regions.
  Focus of attention: Selection and/or dwelling on graphical objects, dwelling on portions of a document or on specific subtext after scrolling through the document.
  Introspection: A sudden pause after a period of activity or a significant slowing of the rate of interaction.
  Undesired effects: Attempts to return to a prior state after an action. These observations including undoing the effect of a recent action, including issuing an undo command, closing a dialog box shortly after it is opened without invoking an operation offered in the context of the dialog.

Inefficient command sequences: User performing operations that could be done more simply or efficiently via an alternate sequence of actions or through easily accessible shortcuts.

Domain-specific syntactic and semantic content. Consideration of special distinctions in content or structure of documents and how the user interacts with these features. These can include domain-specific features associated with the task.

Other techniques for user modeling include but are not limited to: machine-learning, neural networks, predictive statistical models, user model servers, etc. For example, the system 100 can include a user model server, which can be a process that communicates with clients (e.g., dashboards and widgets) and supplies the clients with information about the goals and needs of the user.

In some implementations, the user data can be collected automatically (e.g., on a scheduled basis) or in response to a trigger event. In some implementations, the user data collection process can be manually turned off and on by the user through a preference pane or user interface element (e.g., a button). The user data collection process can be run on the device 102 as a foreground or background process. In some implementations, the user data collection process can be performed by an application running on the network.

In some implementations, user data can be used to search for and/or identify dashboards and/or widgets that can assist the user in achieving a goal or fulfilling a need. For example, the user can be presented with a list of dashboards and/or widgets that the user can download, invoke or preview that can assist the user in achieving a goal or otherwise fulfill a need of the user.

In some implementations, the user data can be used to configure and present dashboards and/or widgets on a display or other output device. Configuring dashboards and widgets can include providing easier access to certain features or functionality, modifying default presentations, forming relationships or links between dashboards and/or widgets and providing update or modifications that conform the dashboard and/or widget to the goals or needs of the user.

Heuristic Model Approach

In some implementations, the system 100 automatically modifies dashboards and/or widgets based on a heuristic model created from input provided by experts. A heuristic model can include a set of rules, which if complied with, indicate that the user is performing a certain task. Patterns of user activity can be compared with a heuristic model to determine how dashboards and widgets should be configured and presented on the device 102 to help the user perform the task. The dashboards and widgets can then be modified to conform to the task and facilitate performance of the task by the user Examples of User-Centric Widget Applications In the example shown, a user of device 102 (e.g., a notebook computer with a wireless connection and GPS) is performing an Internet search on the search query: "detroit baseball." These search terms could be indicative of the user's interest in Detroit City and baseball. The search results include a link to the official Web site of the Detroit Tigers baseball team. Additionally, the device 102 is receiving position information from the GPS 116, and therefore the device 102 is "location-aware." The search terms and positioning information are used to update the user model 114 for the user. In this example, the user model 114 can be stored and maintained on the device 102 and/or on the network.

Referring to the left-hand side of FIG. 1, several user-centric widgets are presented in full screen on a display 104 of the device 102. The widgets presented on the display 104 include a sports widget 108 for providing scores and other information for sporting events, a phone book widget 110 for providing phone numbers and addresses and a maps widget 112 for providing maps. Other user-centric widgets are possible, including but not limited to: a travel guide widget, a maps widget, a music widget, a movie widget, a weather widget, a world clock widget, a stocks widget, a photo widget, a search engine widget and a currency converter widget.

In the example shown, the user was performing a search on the terms "detroit" and "baseball." These terms (i.e., user data) was incorporated into the user model 114. When the user launches the widgets 108, 110, 112, by clicking on representations (or icons) of the widgets on the display 104, the widgets are opened and presented on the display 104 in full screen. The presentations are in formats that conform with the user model 114 that has been modified with the user data. As a result of the modified user model 114, the sports widget 108 displays the final score of the most recent Detroit Tigers game, the phone book widget 110 displays the address of Comerica Park (the Tiger's home field) and other locations of interest near Comerica park (e.g., restaurants) and the maps widget 112 displays a map of Detroit, Mich. and/or Comerica Park. These presentations are merely examples and other formats are possible depending on the user model 114.

In some implementations, the position information from GPS 116 or other positioning technology can be used to modify the states or presentations of the widgets 108, 110 and 112, to conform to the user's goals. In some implementations, the dashboard and/or widgets can be modified after a task is repeated several times (e.g., a history of user actions) to ensure that assumptions regarding the user's goals and needs are accurate. In some implementations, either the position information or the query terms (not both) can be used to trigger a modification of the widgets 108, 110 and 112.

The widgets 108, 110 and 112 are examples of user-centric widgets that can be modified by the user model 114, heuristic model and/or geographic location data. Other examples of user-centric widgets include but are not limited to: a weather widget, a World clock widget and a currency widget. For example, if a user expresses an interest in Tokyo, then the weather widget can present the weather in Tokyo in a prominent manner, the World clock widget can present the local time in Tokyo in a prominent manner and the currency converter can present the Yen as a default currency. A user can express a goal or need in a variety of ways that can be tracked by the system 100. For example, the user can express an interest in Tokyo by searching the Internet for subject matter related to Tokyo. Or, if the user is using the device 102 in Tokyo, then the geographic location of the device 102 can be used to infer a goal or need of the user. In some implementations, if the user receives a large number of mails from Tokyo or routinely surfs web sites related to Tokyo, such actions could be an expression of the user's goals or needs.

In some implementations, the use of a particular dashboard and/or widget will trigger the invocation of another dashboard and/or widget. For example, the frequent use of the phone book 110 widget can trigger the invocation of the maps widget 112, even if the maps widget 112 was not previously used or invoked by the user on the device 102. Dashboards or widgets that are not used a lot can be removed from the device 102. Widgets that can trigger the invocation of other widgets are described in U.S. patent application Ser. No. 11/403,644, for "Linked Widgets," filed Apr. 12, 2006, which patent application is incorporated by reference herein in its entirety.

In some implementations, a user interaction with an application can be used to modify the configuration, state and/or presentation of a dashboard and/or widget. Each application can provide metadata which can be used to configured or present a dashboard and/or widget. For example, a music player application may provide metadata indicating a user's preference for certain genres of music. This metadata can be used to modify the presentation of a music widget (e.g., iTunes® widget) by, for example, prominently displaying music files or other related information in the preferred genre. After the application is terminated, the configuration and/or presentation of the dashboard and/or widget can be made persistent or can revert to a default state.

In some implementations, user interaction with external devices (e.g., digital cameras, storage devices) can be used to infer a user's goals and needs. For example, a digital camera may provide metadata (e.g., date/time, camera orientation, lighting, resolution, position coordinates) that can be used to modify a dashboard and/or widget, or identify new dashboards and/or widgets for download, installation, preview and presentation, etc. The metadata can then be used with a "photo widget" that provides a default presentation having functionality determined by the metadata.

In some implementations, the user model 114 can be used to identify a user based the user's pattern of activity. For example, in a multi-user environment where multiple users share the same device, the user model can be used to identify the user that is currently using the device based on the user's patterns of activity.

Device Architecture for User-Centric Dashboards & Widgets

Figure 2:
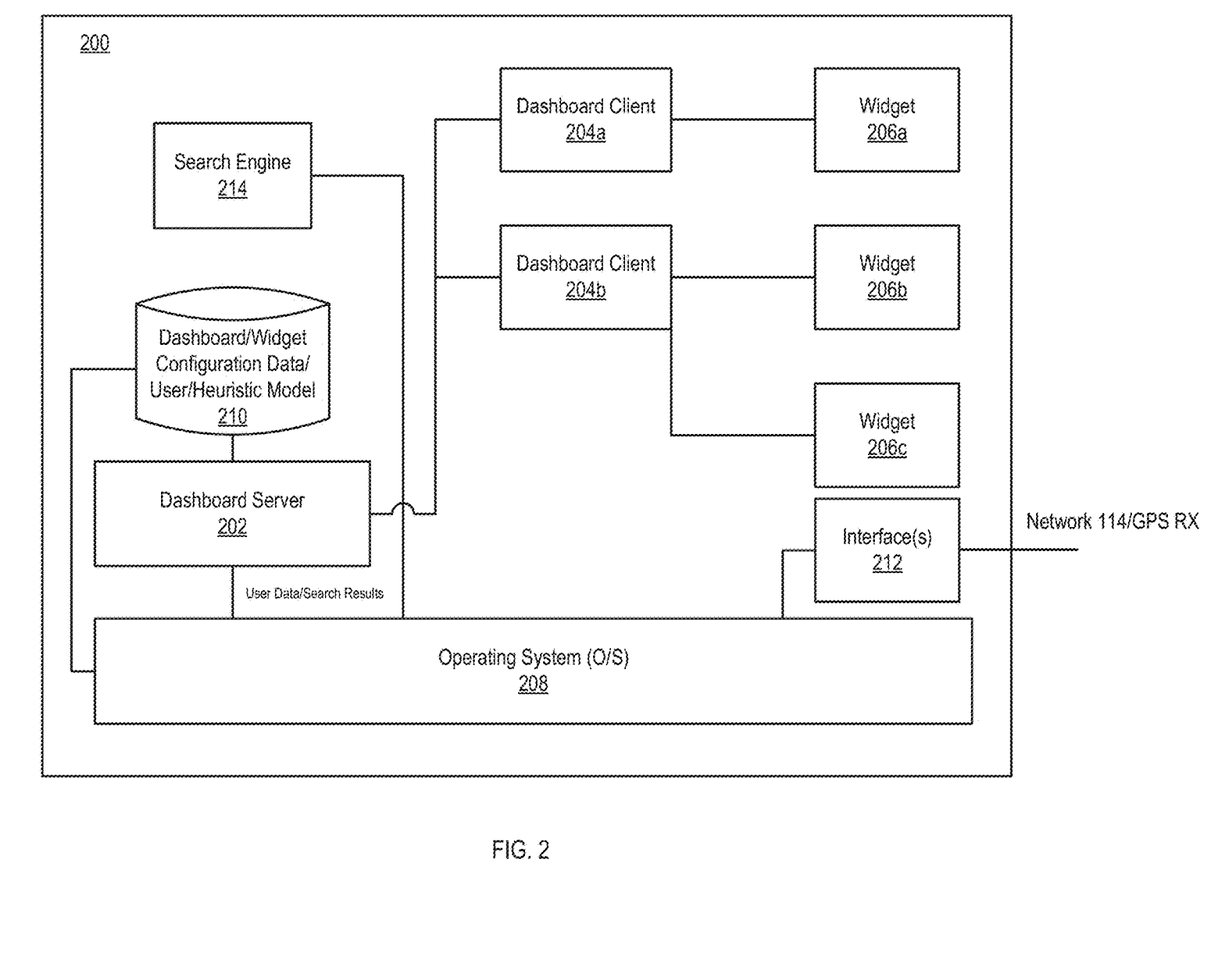
FIG. 2 is a block diagram of an exemplary run time architecture for a device running user-centric dashboards and widgets.

FIG. 2 is a block diagram of an exemplary runtime architecture 200 for a device running user-centric dashboards and widgets. In some implementations, the architecture generally includes a dashboard server 202, dashboard clients 204, widgets 206, an operating system 208 (e.g., Mac OS® X, Windows® XP, Linux® OS), dashboard configuration information repository 210 and one or more interfaces 212 (e.g., network interface card, DSL or cable, modem, PCI card slots).

In some implementations, user-centric information is received through the network interface 212 and stored in the repository 210. In the example shown, the network interface 212 is coupled to the network and a GPS receiver (RX), respectively, for receiving user-centric information from a dashboard/widget configuration service 500 (FIG. 5) and position information from GPS 116. The dashboard server 202 uses the user-centric information and position information to configure one or more dashboards and/or widgets for presentation on the device 102, as described in reference to FIG. 1. In some implementations, the dashboard server 202 can also receive user data and search results from the operating system 208. The search results can be generated by a search engine 214, which can be located in the dashboard server 202, integrated with the operating system 208, or provided in a separate application or plug-in.

In some implementations, the dashboard server 202 is a process that manages one or more dashboard user interfaces. The dashboard server 202 also handles the launching of widgets 206. In some implementations, the dashboard clients 204 are processes that provide the glue between the dashboard server 202 and individual widgets 206. In some implementations, each widget is run inside a separate dashboard client 204. In other implementations, multiple widgets (e.g., 206b, 206c) can run inside each dashboard client 204 (e.g., dashboard client 204b). For example, the clients 204 can provide views in the dashboard for displaying a user interface. In the example shown, the dashboard server 202 launches one client 204 per running widget 206 which provides a sandbox so that the widget 206 does not affect other widgets or applications.

The dashboard server 202 manages one or more widgets 206. If a widget 206 crashes, the widget 206 can be automatically restarted so that the widget reappears in the dashboard. If a widget 206 misbehaves (e.g., crashing more than x times in a row), the widget 206 can be automatically removed from the dashboard.

Widgets 206 can be displayed in the dashboard created by the dashboard server 202 or in other user interfaces, such as a desktop or in a browser or application window (e.g., Safari®). In some implementations, a widget 206 can be stored as a "bundle" of files in the repository 210 (e.g., hard disk, RAM, ROM, flash memory). A bundle is a directory that groups all the needed resources for the widgets 206 together in one place. Widget bundles can be named with a unique extension (e.g., .wdgt).

In some implementations, a given widget contains at least the following files: 1) an HTML file defining a user interface for the widget; 2) a default background image that can be displayed by the dashboard while it loads the widget; 3) an icon image used to represent the widget; and 4) a property list file that contains the widget's identifier, name, version information, size, and main HTML page and other optional information used by the dashboard. The bundle can include other files as needed for the widget, include but not limited to CSS files and JavaScript® files.

In some implementations, a scripting language (e.g., JavaScript®) can be used to provide dynamic behavior in widgets. A script can be distinguished from a program, because programs are converted permanently into binary executable files (i.e., zeros and ones) before they are run. By contrast, scripts remain in their original form and are interpreted command-by-command each time they are run.

JavaScript® in a dashboard can work the same way as it does in any browser with the addition of a widget object. The widget object allows the following actions: 1) access to a user preferences system; 2) flipping a widget over to access preferences or other information and links; 3) respond to dashboard activation events; 4) open other applications; and 5) execute system commands, such as shell scripts or command-line tools.

For widgets built using Web Kit, any Internet plug-in can be run from within the widget. For example; a widget could display a movie using a QuickTime® Internet plug-in. In some implementations, widgets can interact with an application by loading a plug-in and using, for example, a JavaScript® object to bridge JavaScript® with an application programming language (e.g., Objective-C).

Dashboard Server Architecture Example

Figure 3A:
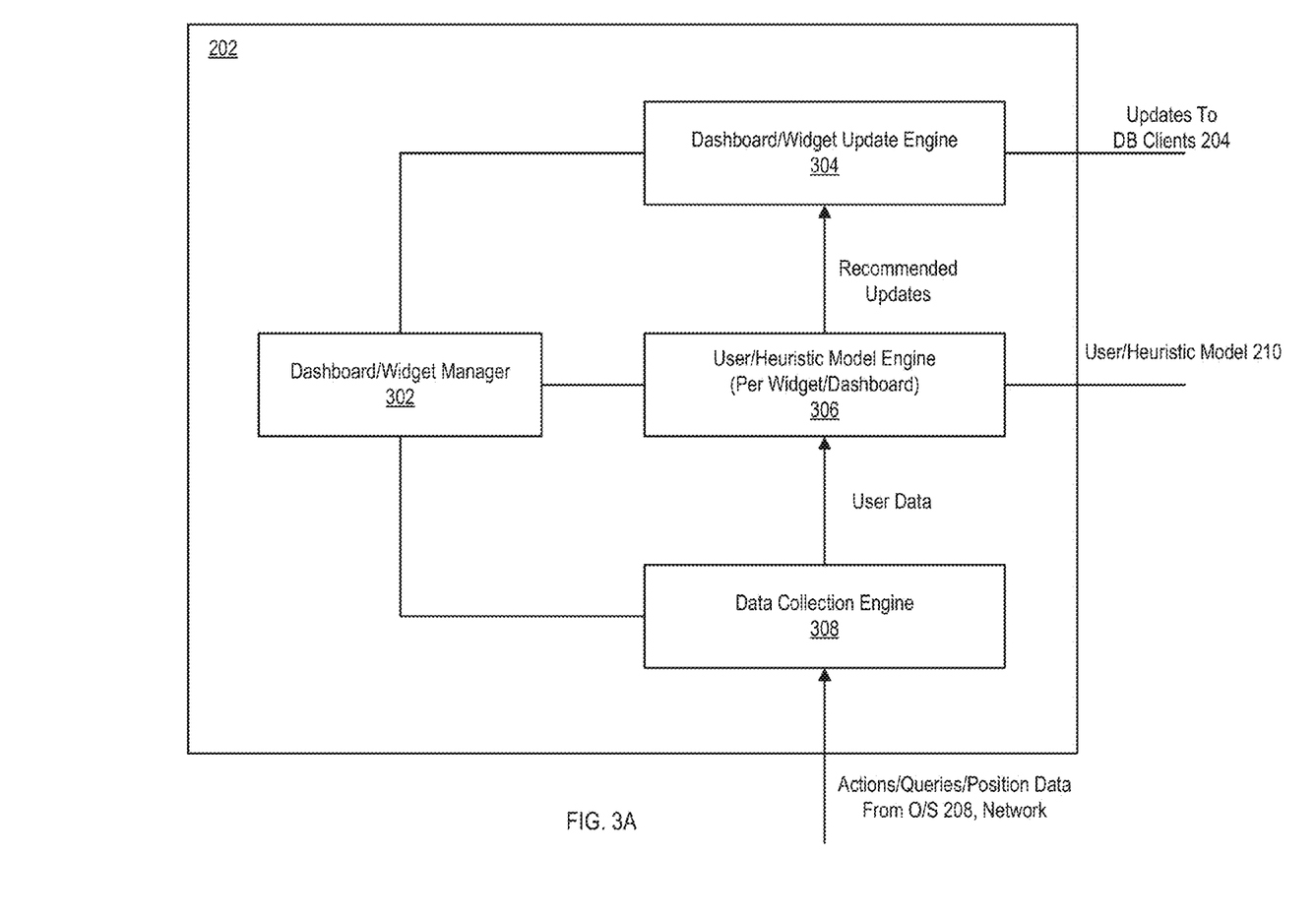
FIG. 3A is a block diagram of one implementation of a software architecture for the dashboard server shown in FIG. 2.

FIG. 3A is a block diagram of one implementation of a software architecture for the dashboard server 202 shown in FIG. 2. In some implementations, the dashboard server 202 includes components for implementing user-centric dashboards and widgets. It should be noted, however, that user-centric dashboards and widgets can be implemented using other architectures and do not have to be implemented in the dashboard server 202. For example, user-centric dashboard/widget functionality can be integrated into the operating system 208, in an application or provided as a plug-in. The components described below can be implemented in software, hardware, firmware, or any combination thereof.

Referring to FIG. 3A, in some implementations the dashboard server 202 includes a dashboard/widget manager 302, a dashboard/widget update engine 304, a user/heuristic model engine 306 and a data collection engine 308. The data collection engine 308 collects user data from one or more of an operating system 208, application, plug-in, external resource, network or any other source of user data. The user/heuristic model engine 306 is operatively coupled to the data collection engine 308 for receiving the user data. The user/heuristic model engine 306 is configurable for updating or otherwise modifying the user model 114 stored in repository 210 (FIG. 2). The dashboard/widget updater engine 304 is operatively coupled to the user/heuristic model engine 306 and is configurable for updating dashboards and widgets based on the user model 114.

In some implementations, the coordination and control of engines 304, 306 and 308 are handled by the dashboard/widget manager 302. In the configuration shown; the dashboard/widget manager 302 also handles the dashboard server and client processes described in reference to FIG. 2. The dashboard/widget manager 302 is operatively coupled to the engines 304, 306 and 308. When the user model 114 is updated, the usage/heuristic model engine 306 notifies the dashboard/widget manager 302 of the update and provides recommended modifications to the dashboard/widget update engine 304. The dashboard/widget manager 302 schedules an update with the dashboard/widget update engine 304 for updating dashboards and/or widgets based on the recommended modifications. The dashboard/widget manager 302 is operatively coupled to the data collection engine 308 for initiating or scheduling data collection processes.

The configuration shown in FIG. 3A is one example of a software architecture for implementing user-centric dashboards and widgets. Other configurations are possible, including configurations where some or all of the components in FIG. 3A are included in one or more widgets. For example, a widget can include a widget update engine, a data collection engine and a user model.

User/Heuristic Model Engine Example

Figure 3B:
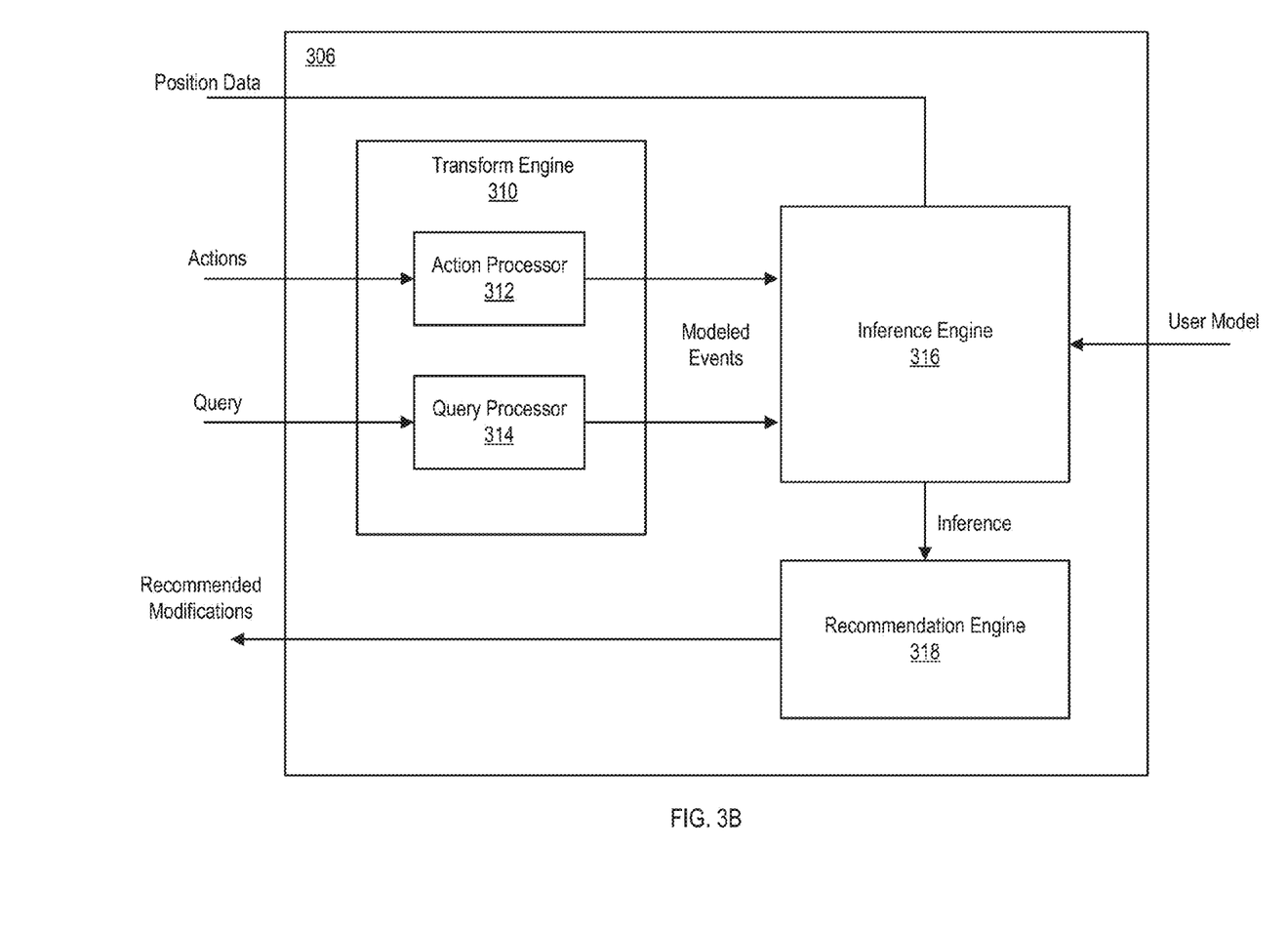
FIG. 3B is a block diagram of one implementation of the user/heuristic model engine shown in FIG. 3A.

FIG. 3B is a block diagram of one implementation of the user/heuristic model engine 306 shown in FIG. 3A. In some implementations, the user/heuristic model engine 306 includes a transform engine 310, an inference engine 316 and a recommendation engine 318.

In some implementations, the transform engine 310 includes an action processor 312 and a query processor 314. Low-level time-stamped actions provided by the operating system 208 are transformed by the action processor 312 into higher-level semantics modeled events) representing user actions. Likewise, the query processor 314 transforms query search terms into modeled events. Examples of low-level actions can include mouse and keyboard actions, access to menus being visited, dialog boxes being opened and closed, selection of graphical objects, menu surfing, mouse meandering, menu jitter, the status of data structures, etc. After the actions and queries are transformed into modeled events, the modeled events are stored in an event queue, where the events await processing by the inference engine 316.

In some implementations, the inference engine 316 includes a Bayesian user model. Events in the queue are transformed into observations represented by in the Bayesian user model. The inference engine 318 periodically analyzes an event in the event queue and generates an inference on the event based on the user model 114 and other information (e.g., position data). The inference is received by the recommendation engine 318, which generates an update or modification recommendation for the dashboard/widget update engine 304 based on the inference. The recommendation could include identification of a particular dashboard or widget to be presented on the device 102 and a script for modifying the dashboard or widget. Examples of updates or modifications include but are not limited to: resetting default parameters, selecting new user interfaces from a plurality of template user interfaces, associating the dashboard or widget with one or more related dashboards or widgets, adding or removing features, functionality or resources to or from the dashboard or widget or any other desired modification. Modifications can be made persistent across multiple user sessions or a single user session.

In some implementation, an events language can be used to create runtime filters for modeled events or sequence of events. The event language can include operators including but not limited to the following operators:

Rate($x_i$, t): The number of times an event xi occurs in t seconds or commands.

Oneof($\{x_1, \ldots, x_n\}$, t): At least one event of denoted set of events occurs in t.

All($\{x_1, \ldots, x_n\}$, t): All events of a denoted set of events occur at least once in any sequence within t.

Seq($x_1, \ldots, x_n$, t): Events occur in a specified order within t.

TightSeq($x_1, \ldots, x_n$, t): Events occur in a specified order within t and no other events occur.

Dwell(t): There is no user action for at least t seconds.

These and other operators can be used to define filters for higher-level events, such as user dwelled for at least t seconds at item x in menu y following a scroll through menu y. An example of an inference that can be drawn from this event description is that the user found an item of interest in menu y. Thus, a dashboard and/or widget can be presented on the device 102 that can provide information, assistance or functionality related to item x.

A more detailed description of event language and its use can be found in Horvitz et al. The Lumiere Project: Bayesian User Modeling for Inferring the Goals and Needs of Software Users.

Exemplary Dashboard/Widget Modification Process

Figure 4:
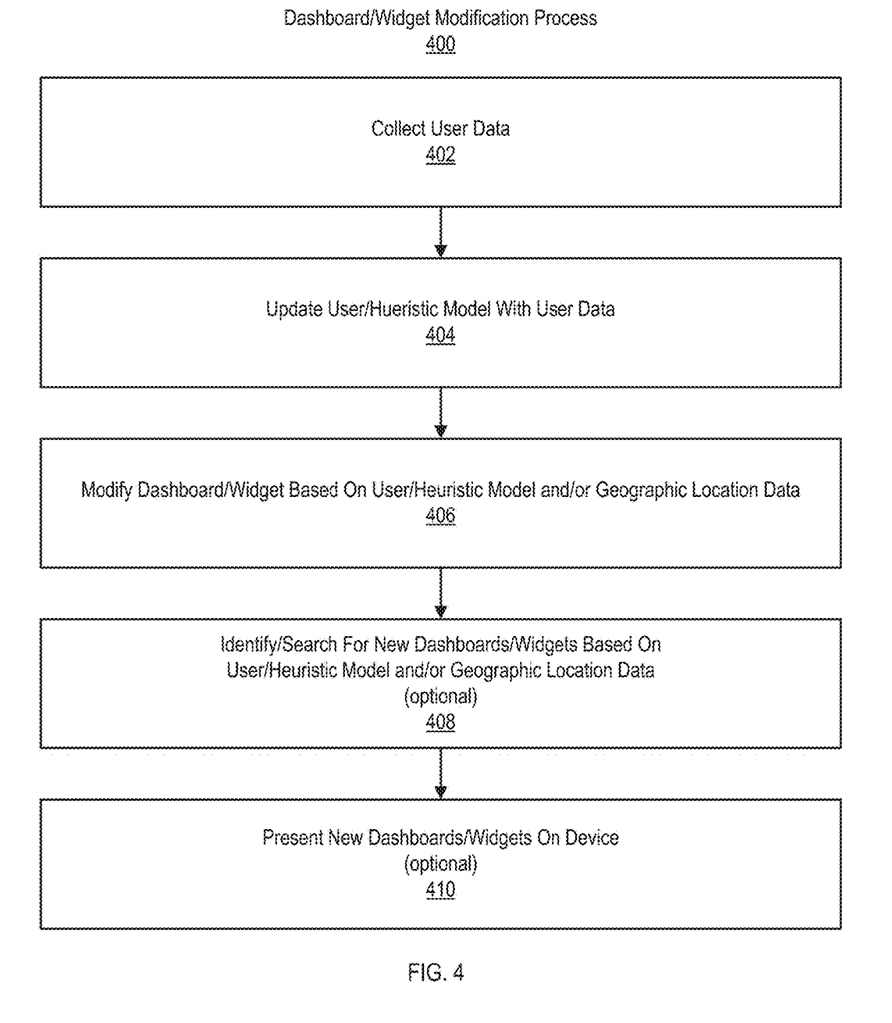
FIG. 4 is a flow diagram of one implementation of a dashboard and widget modification process.

FIG. 4 is a flow diagram of one implementation of a dashboard and widget modification process 400. The process 400 begins when user data (e.g., actions, queries) are collected by, for example, a data collection engine (402). A user model (e.g., a Bayesian user model) is updated with the user data (406). In some implementations, a heuristic model can be used. In some implementations, position data can be used alone or in combination with the user model 114 and/or heuristic model.

Dashboards and/or widgets are modified based on the user model (408), as described in reference to FIGS. 3A and 3B. In some implementations, the process 400 can include a search (e.g., using a search engine) for new dashboards or widgets based on the user model (410) and presented on a device (412). In some implementations, a dashboard/widget service 500 can provide new dashboards or widgets for a device, as described in reference to FIG. 5.

Dashboard/Widget Service

Figure 5:
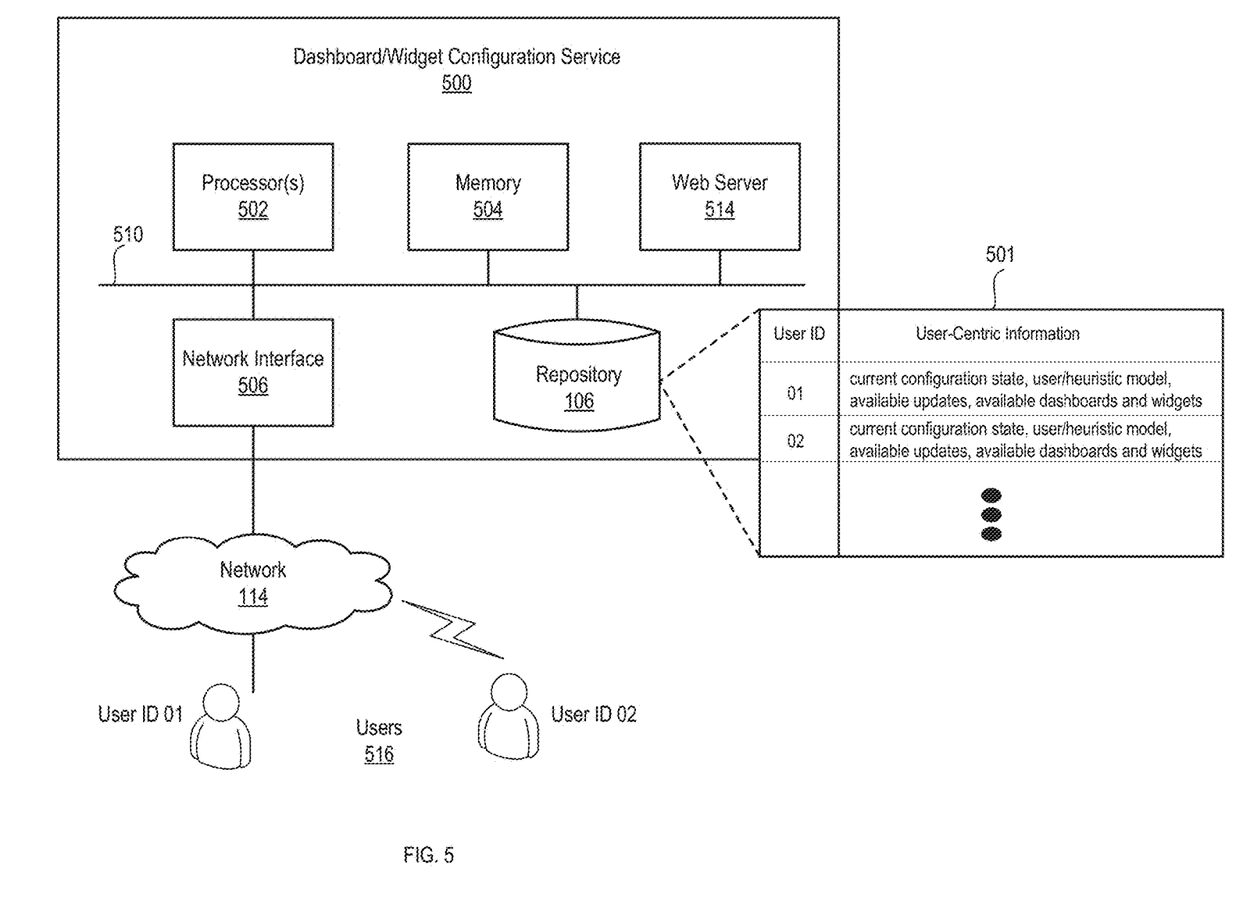
FIG. 5 is a block diagram of one implementation of an architecture for a dashboard/widget.

FIG. 5 is a block diagram of an exemplary dashboard/widget service 500. In some implementations, the service 500 generally includes one or more processors 502, memory 504, a network interface 506, a repository 508 and a web server 514. The service 500 can be a web site that includes one or more servers. The repository 508 is used to store user-centric information 501. The information 501 can include current configuration state for a device to facilitate restoration, user/heuristic models, available updates, available dashboards and widgets, information for displaying widgets (e.g., widget width and height) and for controlling the functionality of dashboards and widgets (e.g., work flows, navigation, access to resources, security) and any other information that has a user-centric nature (e.g., user profiles, preferences, personal information).

The repository 508 can be a database implemented on one or more storage devices (e.g., hard disks, optical disks, memory, storage area network (SAN)) using known database technology (e.g., MySQL®). The web server (e.g., Apache® web server) 514 serves web pages to devices through the network interface 506 (e.g., network interface card, router, huh) and network 512 (e.g., the Internet, wireless network). Memory 504 can be any computer-readable medium (e.g., RAM, ROM, hard disks, optical disks, memory modules). Memory 504 can store instructions for execution by processor(s) 502 (e.g., Intel® Core™ Duo processors). The instructions can be for an operating system (e.g., Mac OS® X server, Windows® NT, Unix, GNI/Linux), network communication software (e.g., TCP/IP software), applications and/or any other software used by the configuration service 700.

As described in reference to FIG. 1, a user 516 can connect a device to network 512 either directly or through a host computer. Upon connection, the user's browser can be automatically opened and the user can be directed by a URI to a website operated by the configuration service 500. The user 516 can be associated with a User ID that can be used by the configuration service 500 to index the repository 508 and identify user-centric information 501 associated with the User ID. In the example shown, "User ID 01" can be associated with a first user 516 of a particular brand and model of, for example, a media player/recorder. Similarly, the "User ID 02" can be associated with a second user 516 of a particular brand and model of mobile phone.

In some implementations, the service 500 maintains and stores in a repository 106 one or more user/heuristic models for users, which can be accessed by the users 516 over a network and used to recommend modifications to dashboards and widgets. The repository can also include configuration data, templates and other user data that can be used to modify dashboards and/widgets, as described in reference to FIGS. 1-4.

Dashboard/Widget APIs

In some implementations, dashboards and widgets interact with an application programming interface (API). A dashboard or widget can be installed on a device and configured to communicate with the device through the API. In some implementations, a dashboard or widget can introspect the environment of a device using the API, and then configure itself to work on the device using information obtained through the API. In some implementations, a dashboard or widget can provide information to the device through the API, allowing the device to configure itself to work with the dashboard or widget.

In some implementations, the API specifies a "presentation mode" that describes the display capability of a device. For example, a dashboard or widget can learn the "presentation mode" of a device and configure itself to comply with the mode. In some implementations, the "presentation mode" could include a "large display" configuration, a "medium display" configuration and a "small display" configuration, which correspond to the display size of the device. For example, in a "small display" configuration, the dashboard or widget can scale icons and images to fit the small display.

In some implementations, the API specifies an "input capability" that describes the input controls available on a device. A dashboard or widget can learn of the input capabilities of a device through the API and configure itself to work with those capabilities. For example, if a device includes a scroll wheel, a widget can configure itself to allow scrolling that is optimized for a scroll wheel.

In some implementations, the API can be used by the dashboard/widget update engine 304 (FIG. 3A) to modify dashboards and/or widgets in accordance with modification recommendations, as described in reference to FIGS. 1-4.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors; and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A method comprising:
at an electronic device with a display and one or more input devices:
displaying, on the display, a user interface that includes a first widget and a second widget that are installed on the electronic device;
detecting, at the electronic device, a first user activity;
after detecting the first user activity, receiving, via the one or more input devices, a request to open one of the first widget and the second widget;
in accordance with a determination that the request is a request to open the first widget, opening the first widget with information selected by the first widget based on the first user activity; and
in accordance with a determination that the request is a request to open the second widget that is different from the first widget, opening the second widget with information selected by the second widget based on the first user activity.

2. The method of claim 1, wherein the first user activity includes performance of a search using a search term, and wherein the information selected by the first widget or the information selected by the second widget is based on the search term.

3. The method of claim 1, wherein the first user activity includes a location of the electronic device, and wherein the information selected by the first widget or the information selected by the second widget is based on the location.

4. The method of claim 1, wherein the first user activity includes receipt of communications referring to a topic, and wherein the information selected by the first widget or the information selected by the second widget is based on the topic.

5. The method of claim 1, wherein the first user activity includes navigation to one or more websites referring to a topic, and wherein the information selected by the first widget or the information selected by the second widget is based on the topic.

6. The method of claim 1, wherein the first user activity includes invocation of a third widget, and wherein information selected by the first widget or the information selected by the second widget is based on the third widget.

7. The method of claim 1, wherein the first user activity includes capture of an image and associated metadata, and wherein information selected by the first widget or the information selected by the second widget is based on the associated metadata.

8. The method of claim 1, wherein the first user activity includes one of a second user activity of a first user and a third user activity of a second user, the method further comprising identifying a user associated with the request to open one of the first widget and the second widget, wherein:
   in accordance with a determination that the user associated with the request to open one of the first widget and the second widget is the first user, the information selected by the first widget or the information selected by the second widget is based on the second user activity; and
   in accordance with a determination that the user associated with the request to open one of the first widget and the second widget is the second user, the information selected by the first widget or the information selected by the second widget is based on the third user activity.

9. The method of claim 1, further comprising, in accordance with a determination that the first user activity fails to include invocation of a third widget at least a threshold number of times, deleting the third widget from the electronic device.

10. A non-transitory computer-readable medium storing instructions which, when executed, cause an electronic device with a display and one or more input devices to perform a method comprising:
   displaying, on the display, a user interface that includes a first widget and a second widget that are installed on the electronic device;
   detecting, at the electronic device, a first user activity;
   after detecting the first user activity, receiving, via the one or more input devices, a request to open one of the first widget and the second widget;
   in accordance with a determination that the request is a request to open the first widget, opening the first widget with information selected by the first widget based on the first user activity; and
   in accordance with a determination that the request is a request to open the second widget that is different from the first widget, opening the second widget with information selected by the second widget based on the first user activity.

11. The non-transitory computer-readable medium of claim 10, wherein the first user activity includes performance of a search using a search term, and wherein the information selected by the first widget or the information selected by the second widget is based on the search term.

12. The non-transitory computer-readable medium of claim 10, wherein the first user activity includes a location of the electronic device, and wherein the information selected by the first widget or the information selected by the second widget is based on the location.

13. The non-transitory computer-readable medium of claim 10, wherein the first user activity includes receipt of communications referring to a topic or navigation to one or more websites referring to a topic, and wherein the information selected by the first widget or the information selected by the second widget is based on the topic.

14. The non-transitory computer-readable medium of claim 10, wherein the first user activity includes one of a second user activity of a first user and a third user activity of a second user, the method further comprising identifying a user associated with the request to open one of the first widget and the second widget, wherein:
   in accordance with a determination that the user associated with the request to open one of the first widget and the second widget is the first user, the information selected by the first widget or the information selected by the second widget is based on the second user activity; and
   in accordance with a determination that the user associated with the request to open one of the first widget and the second widget is the second user, the information selected by the first widget or the information selected by the second widget is based on the third user activity.

15. The non-transitory computer-readable medium of claim 10, the method further comprising, in accordance with a determination that the first user activity fails to include invocation of a third widget at least a threshold number of times, deleting the third widget from the electronic device.

16. An electronic device comprising:
   a display;
   one or more input devices; and
   one or more processors configured to:
      display, on the display, a user interface that includes a first widget and a second widget that are installed on the electronic device;
      detect, at the electronic device, a first user activity;
      after detecting the first user activity, receive, via the one or more input devices, a request to open one of the first widget and the second widget;
      in accordance with a determination that the request is a request to open the first widget, open the first widget with information selected by the first widget based on the first user activity; and
      in accordance with a determination that the request is a request to open the second widget that is different from the first widget, open the second widget with information selected by the second widget based on the first user activity.

17. The electronic device of claim 16, wherein the first user activity includes performance of a search using a search term, and wherein the information selected by the first widget or the information selected by the second widget is based on the search term.

18. The electronic device of claim 16, wherein the first user activity includes a location of the electronic device, and wherein the information selected by the first widget or the information selected by the second widget is based on the location.

19. The electronic device of claim 16, wherein the first user activity includes receipt of communications referring to a topic or navigation to one or more websites referring to a topic, and wherein the information selected by the first widget or the information selected by the second widget is based on the topic.

20. The electronic device of claim 16, wherein the first user activity includes one of a second user activity of a first user and a third user activity of a second user, wherein the one or more processors are further configured to identify a user associated with the request to open one of the first widget and the second widget, and wherein:
- in accordance with a determination that the user associated with the request to open one of the first widget and the second widget is the first user, the information selected by the first widget or the information selected by the second widget is based on the second user activity; and
- in accordance with a determination that the user associated with the request to open one of the first widget and the second widget is the second user, the information selected by the first widget or the information selected by the second widget is based on the third user activity.

21. The method of claim 1, wherein the first user activity is detected while the first widget and the second widget are installed on the electronic device.

22. The non-transitory computer-readable medium of claim 10, wherein the first user activity is detected while the first widget and the second widget are installed on the electronic device.

23. The electronic device of claim 16, wherein the first user activity is detected while the first widget and the second widget are installed on the electronic device.

* * * * *